(12) United States Patent
Coaplen et al.

(10) Patent No.: US 11,745,817 B2
(45) Date of Patent: Sep. 5, 2023

(54) OFFSET BUSHINGS AND ALIGNMENT FEATURES OF A DROPPER SEATPOST ASSEMBLY

(71) Applicant: Fox Factory, Inc., Braselton, GA (US)

(72) Inventors: Joshua Coaplen, Asheville, NC (US); John Ralph Kiffmeyer, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/332,868

(22) Filed: May 27, 2021

(65) Prior Publication Data

US 2021/0371028 A1 Dec. 2, 2021

Related U.S. Application Data

(60) Provisional application No. 63/031,334, filed on May 28, 2020.

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC .................................................. B62J 2001/085
See application file for complete search history.

(56) References Cited

U.S. PATENT DOCUMENTS

| | | | |
|---|---|---|---|
| 7,025,522 B2 | 4/2006 | Sicz et al. | |
| 8,317,261 B2 | 11/2012 | Walsh et al. | |
| 8,752,893 B2 | 6/2014 | Chien et al. | |
| 8,781,690 B2 | 7/2014 | Hara et al. | |
| 8,833,848 B2 | 9/2014 | Shirai | |
| 8,894,025 B2 | 11/2014 | Wehage et al. | |
| 9,376,159 B2 | 6/2016 | Kuo | |
| 9,422,018 B2 | 8/2016 | Pelot et al. | |
| 9,878,754 B2 | 1/2018 | Tsai | |
| 9,981,707 B1 * | 5/2018 | Chen | B62H 5/001 |
| 10,081,405 B2 | 9/2018 | Mcandrews et al. | |
| 10,093,374 B2 | 10/2018 | Mcpherson et al. | |
| 10,399,624 B2 | 9/2019 | Teixeira | |
| 10,422,355 B2 | 9/2019 | Pittens et al. | |
| 10,450,022 B2 | 10/2019 | Watson | |
| 10,479,431 B2 | 11/2019 | Winefordner et al. | |
| 10,513,300 B2 | 12/2019 | Bowers | |
| 10,562,578 B2 | 2/2020 | Teixeira et al. | |
| 10,625,800 B2 | 4/2020 | Mcandrews et al. | |

(Continued)

FOREIGN PATENT DOCUMENTS

| | | | |
|---|---|---|---|
| CA | 3053537 A1 | | 2/2020 |
| CN | 108622249 A | * | 10/2018 |

(Continued)

*Primary Examiner* — Timothy J Brindley

(57) ABSTRACT

A dropper seatpost assembly is disclosed. The dropper seatpost assembly includes a lower post and an upper post configured to telescopically move with respect to the lower post. The dropper seatpost assembly also includes a translating mechanism configured to maintain an orientation such as a lateral orientation, a rotational orientation, or both a lateral orientation and a rotational orientation of the upper post with respect to the lower post as the upper post telescopically moves with respect to the lower post, the translating mechanism comprising two or more vertically offset features.

21 Claims, 7 Drawing Sheets

(56) References Cited

U.S. PATENT DOCUMENTS

| | | | |
|---|---|---|---|
| 10,647,373 B2 | 5/2020 | Mcandrews et al. | |
| 10,710,662 B2 | 7/2020 | Bowers et al. | |
| 10,780,932 B2 | 9/2020 | Shirai | |
| 10,974,781 B2 | 4/2021 | Staples | |
| 11,091,215 B2 | 8/2021 | Madau et al. | |
| 11,180,212 B2 | 11/2021 | Shirai | |
| 2018/0134337 A1* | 5/2018 | Holtzman | F16B 7/105 |
| 2018/0194418 A1* | 7/2018 | Bowers | B62J 1/08 |
| 2019/0002048 A1 | 1/2019 | Winefordner et al. | |
| 2019/0061852 A1* | 2/2019 | Shirai | B62K 19/36 |
| 2019/0111985 A1* | 4/2019 | Teixeira | B62K 25/286 |
| 2019/0308681 A1* | 10/2019 | Staples | B62J 1/08 |
| 2019/0367114 A1 | 12/2019 | Winefordner et al. | |
| 2020/0070913 A1 | 3/2020 | Staples | |
| 2021/0094642 A1* | 4/2021 | Dubois | B62J 1/08 |
| 2021/0371028 A1 | 12/2021 | Coaplen et al. | |

FOREIGN PATENT DOCUMENTS

| | | | | |
|---|---|---|---|---|
| CN | 110126944 A | * | 8/2019 | |
| CN | 209617331 U | | 11/2019 | |
| CN | 110525551 A | * | 12/2019 | |
| CN | 210634677 U | | 5/2020 | |
| CN | 111846044 A | * | 10/2020 | |
| CN | 212401431 U | | 1/2021 | |
| CN | 112606930 A | * | 4/2021 | B62J 1/08 |
| CN | 112606930 A | | 4/2021 | |
| CN | 213008477 U | | 4/2021 | |
| CN | 213138994 U | | 5/2021 | |
| CN | 213168365 U | | 5/2021 | |
| CN | 213705633 U | | 7/2021 | |
| CN | 214648699 U | | 11/2021 | |
| DE | 202019002079 U1 | * | 7/2019 | |
| EP | 2899108 A1 | * | 7/2015 | B62J 1/08 |
| KR | 20110002513 U | | 3/2011 | |
| KR | 102335491 B1 | * | 3/2021 | |
| TW | I615306 B | | 2/2018 | |
| TW | M576558 U | | 4/2019 | |
| TW | M599270 U | | 8/2020 | |
| TW | M605174 U | | 12/2020 | |
| TW | M605175 U | | 12/2020 | |
| TW | M605177 U | | 12/2020 | |
| TW | M613821 U | | 7/2021 | |
| TW | M613950 U | | 7/2021 | |

* cited by examiner

OFFSET BUSHINGS AND ALIGNMENT FEATURES OF A DROPPER SEATPOST ASSEMBLY

CROSS-REFERENCE TO RELATED APPLICATIONS (PROVISIONAL)

This application claims priority to and benefit of U.S. Provisional Patent Application No. 63/031,334 filed on May 28, 2020, entitled "OFFSET BUSHINGS AND ALIGNMENT FEATURES OF A DROPPER SEATPOST ASSEMBLY" by Coaplen et al., and assigned to the assignee of the present application, the disclosure of which is hereby incorporated by reference in its entirety.

FIELD OF THE INVENTION

Embodiments of the invention generally relate to systems and methods for coupling a dropper seatpost with a frame.

BACKGROUND

Seat (or saddle) height and orientation are important parts of a vehicle setup (such as a bike, unicycle, tricycle, electric bike (e-bike), and the like). If the saddle is too high, a rider would feel unstable and have difficulty reaching the ground or even the bottom stroke of the pedals. In contrast, if the saddle is too low, the rider sitting in the saddle would feel cramped and would not obtain proper leg extension while pedaling in the seated position. Moreover, what would be considered a good saddle height for riding along a relatively flat surface may not be a good saddle height for climbing a hill, descending a hill, riding across rough terrain, etc. As such, there is no universally applicable saddle geometry settings, instead saddle settings are always subject to rider and use case preferences and geometries.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of vehicles that have a seat, a bicycle (bike) will be used to provide guidance for the terms and directional language. However, it should be appreciated that the embodiments are also well suited for other vehicles such as, but not limited to, road bike, mountain bike, gravel bike, unicycle, tricycle, electric bike (e-bike), and the like The term "seatpost" refers to a stand-alone component, e.g., a tube or another geometric shaped member that has at least a portion of a head assembly at an end or an approximate end thereof. The head assembly is used to couple a bike saddle with the seatpost.

The term "seat post opening" refers to an opening in a portion of a bike frame within which the seatpost is inserted or otherwise attached.

The term "saddle height" refers to the distance between the top of the saddle (e.g., where a rider would sit) and the ground, or the pedals, or another frame of reference of the bike. For example, a taller rider would normally have a higher saddle height than that of a shorter rider.

The following discussion provides a novel solution to overcome a restriction in movement of a dropper seatpost caused by a deformation of an outside post within which an inner post of the dropper seatpost is expected to extend and/or retract. In one embodiment, one or more parts of a translating mechanism, e.g., a mechanism used to maintain the orientation of the inner post and the outer post during extension and retraction, are offset such that the inner post is not 'pinched' or otherwise suffers an impediment to its range of motion when the outer post is deformed. In general, the outer post could be deformed by aspects such as, but not limited to, an overtightening of seatpost retaining clamp, an impact to a portion of the outer post, or the like.

Moreover, embodiments described herein provide a dropper seatpost that can be used with a number of different frames, different seatpost clamps, different seatpost clamp torques, and different dropper seatpost designs.

Operation

Figure 1:
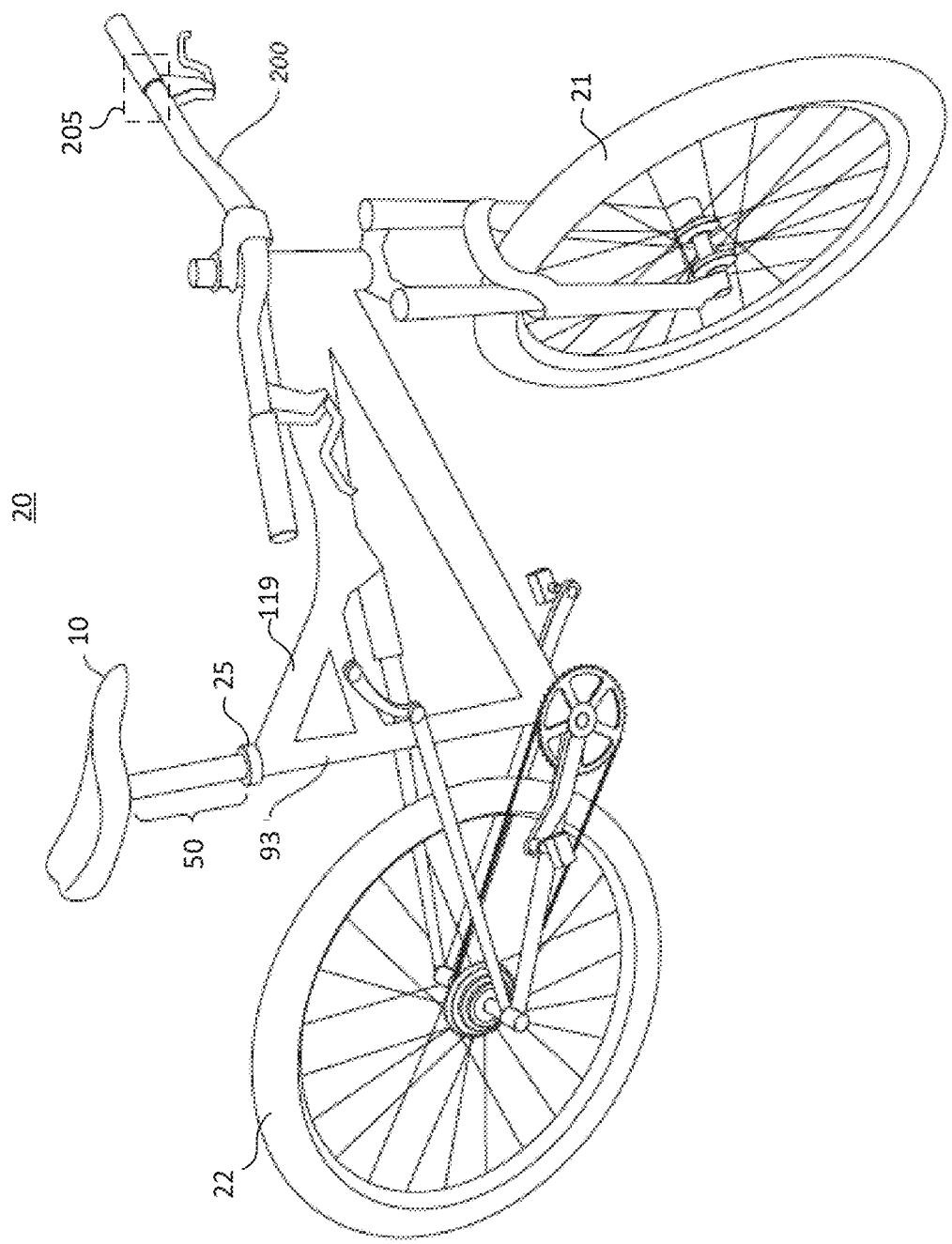
FIG. 1 is a perspective view of a bike, in accordance with an embodiment.

Referring now to FIG. 1, a bike 20 is shown in accordance with an embodiment. In general, bike 20 has a front (e.g., the general location of the handlebars 200 and the front wheel 21) and a rear (e.g., the general location of the rear wheel 22). For purposes of the discussion the front and rear of the bike 20 can be considered to be in a first plane. A second plane that is perpendicular to the first plane would be similar to an exemplary flat plane of the ground upon which bike 20 is ridden.

In general, the bike 20 includes pedals, wheels, a chain or other drive mechanism, brakes, an optional suspension, a saddle 10 (or bike seat), handlebars 200, a dropper seatpost 50, a rider interface 205, a frame 119, a seat post opening 93, and a seatpost clamp 25.

When installing a standard seatpost, the seatpost is partially inserted into the seat post opening 93 and then held in position with a clamping member such as seatpost clamp 25. In so doing, a rider is able to adjust the amount of seatpost sticking out of the seat post opening 93; which is directly related to the vertical height of the saddle (e.g., the saddle height- or how far the saddle is above the ground, above the pedals, etc.).

In one embodiment, a head assembly allows the saddle 10 to be adjustably located with respect to the seatpost before and after the seatpost is installed in the seat post opening 93. For example, once the seatpost is installed in the seat post opening 93, the head assembly adjustability will allow a rider to adjust the horizontal location of the saddle 10 (e.g., toward the front or rear of the bike) and the pitch of the saddle 10 (e.g., nose-up, nose-level, nose-down).

In a standard seatpost configuration, part of the bike setup is establishing an appropriate saddle height for a given rider. For example, a rider would have a certain saddle to pedal distance, e.g., a pre-established (hereinafter "normal") saddle height. This normal saddle height is rider specific and can include a number of trials before the rider settles on the normal saddle height. Once the normal saddle height is determined, the seatpost is clamped into a fixed position such that the normal saddle height and saddle 10 orientation is maintained until the seatpost is unclamped.

This modifiable saddle height capability is important to allow different riders to utilize similar components and merely adjust the saddle height by changing the amount of seatpost that is extending from the seat post opening 93. However, as a rider tackles different challenges throughout a given ride, there is a growing need for the capability to make rider-to-bike saddle-height geometry changes.

For example, when going up a hill and/or sprinting, a rider will often take a standing position for additional leverage, power transference, and the like. In another example, when going down a hill (or over rough terrain, if standing for additional leverage, etc.), a rider would likely prefer a shorter saddle to pedal distance (hereinafter lower saddle height) to allow the rider to lower their center of gravity, lean further backward to change the center of gravity of the bike, use their legs to absorb bumps, and the like. As such, it is helpful to be able to adjust the saddle height during a ride.

A dropper seatpost assembly (hereinafter dropper seatpost 50) is a seatpost design shown in detail in FIG. 4A through FIG. 6 and described in further detail herein. In one embodiment, the basic dropper seatpost 50 design includes a lower post that is fixedly coupleable to the bike frame and an upper post that is telescopically moveably coupled with the lower post and which includes the head assembly at a top thereof.

In one embodiment, an actuator assembly allows the upper post to be vertically moveable (or adjustable) with respect to the lower post, such that the rider can operate a rider interface 205 (such as a control lever or the like) to "drop" the dropper seatpost 50 to a lowered saddle height and then use the rider interface 205 (which may mean the same (or a different) control lever) to "return" the dropper seatpost 50 to the normal saddle height. In one embodiment, this two-position capability allows a rider to have a normal saddle height and also a lowered saddle height for traversing uphill's, sprints, downhills, bumpy terrain, or the like. Although in one embodiment two positions are mentioned, as discussed in detail herein, in one embodiment, the dropper seatpost 50 could be adjustable to a plurality or an "infinite" number of different saddle height positions. Thus, the use of two positions is merely one embodiment which is used herein for purposes of clarity.

In one embodiment, dropper seatpost 50 is inserted into seat post opening 93 (such as, for example, in one embodiment, via a slip-fit or the like) and seatpost clamp 25 is used to removably couple the dropper seatpost 50 with the seat post opening 93. Once seatpost clamp 25 is tightened, the dropper seatpost 50 and the saddle 10 attached thereto will be removably coupled at a given orientation with respect to frame 119.

In one embodiment, the weight of dropper seatpost 50 is an important guiding principle in the development and manufacture design criteria for dropper seatpost 50. It is often the case (and may also be dependent upon use case) that a lighter dropper seatpost 50 is preferred over a heavier dropper seatpost 50. As such, in one embodiment, areas where weight savings can be obtained in a dropper seatpost 50 design include manufacturing one or more of the dropper seatpost 50 components with a thinner wall thickness, using a lighter material, etc.

With respect to bike frame 119, between bike frame manufacturers, seat post opening 93 diameters can differ in size by a number of millimeters. Thus, a dropper seatpost 50 having a certain diameter could fit snugly within a given frame 119 having a seat post opening 93 with a first diameter, but be somewhat loose in a frame 119 with a seat post opening 93 having a second diameter that is a bit larger than the first diameter. Thus, in one embodiment, where frame 119 has the larger diameter seat post opening 93, the seatpost clamp 25 would need to provide additional clamping force to reduce the diameter of the seat post opening 93 and properly clamp and maintain the orientation of the dropper seatpost 50. However, this increased amount of clamping force on the seat post opening 93 (which is usually made with thicker material than that of the lower post of dropper seatpost 50) would likely also slightly deform the lower post of the dropper seatpost 50 inserted therein.

With respect to seatpost clamp 25, in one embodiment, a rider may upgrade a seatpost clamp 25, replace a seatpost clamp 25 or the like. This replacement or upgrade could be based on wear, age, environment, weight reduction purposes, functional purposes (e.g., heavy duty clamp for more challenging environments or performance requirements), etc. With different seatpost clamps, there can be different torque requirements, different clamping ranges, different pressure application, etc. Thus, for example, the original seatpost clamp 25 may have had a torque required for clamping of 10 ft-lbs., while the replacement seatpost clamp 25 has a torque required for clamping of 30 ft-lbs. In one embodiment, the replacement seatpost clamp with the higher torque requirement would therefore have a higher clamping pressure and would likely provide further deformation of the seat post opening 93 which would also likely result in a slight deformation of the lower post of the dropper seatpost 50 after it has been inserted therein and the seatpost clamp 25 has been tightened to the higher clamping pressure.

With respect to dropper seatpost 50 designs, between different dropper seatpost 50 manufacturers, dropper seatpost 50 diameters can differ in size by a number of millimeters. Thus, a dropper seatpost 50 having a certain diameter could properly slip-fit within a given seat post opening 93, but a different dropper seatpost 50 having a smaller diameter would be somewhat loose in the same seat post opening 93. Thus, in the smaller dropper seatpost 50 diameter example, in one embodiment, the seatpost clamp 25 would need to provide additional clamping force to reduce the seat post opening 93 to properly clamp and maintain the dropper seatpost 50. However, this increased amount of clamping force on seat post opening 93 (which is usually thicker material than that of the dropper seatpost 50) would likely also slightly deform the lower post of dropper seatpost 50 that is inserted therein.

Figure 2:
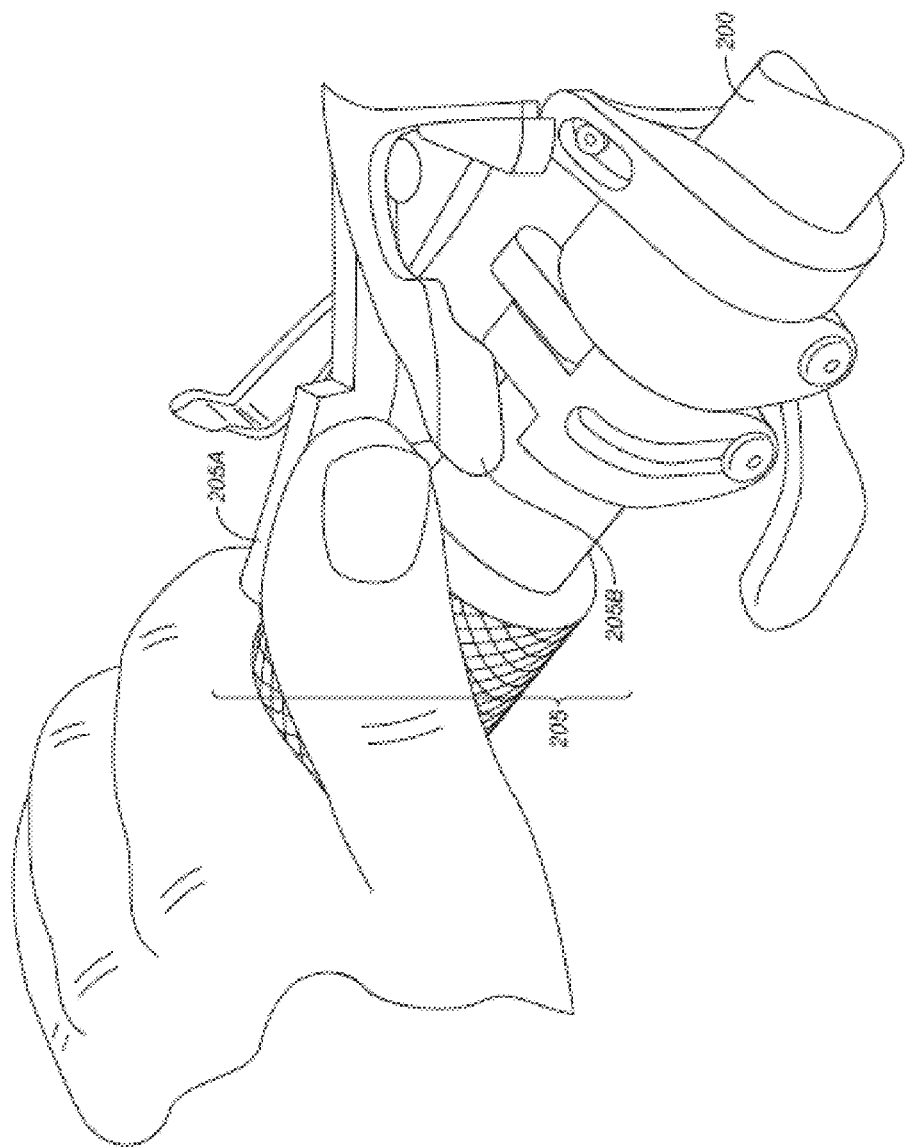
FIG. 2 is a perspective view of a handlebar with a control lever coupled therewith, in accordance with an embodiment.

FIG. 2 depicts a blown-up portion of handlebar 200 having the rider interface 205 coupled therewith according to an embodiment. The rider interface 205 is a type of rider interface with which the rider employs for communicating saddle height instructions to the dropper seatpost 50. Of note, the rider interface 205 may be, but is not limited to, any of the following components capable of communicating with the dropper seatpost 50: wireless device, power meter, heart rate monitor, voice activation device, GPS device having stored map, graphical user interface (GUI), button, dial, smart phone (e.g., iPhone™), lever, button, or the like. Moreover, although the rider interface 205 is shown coupled with handlebar 200. In another embodiment, the rider interface 205 could be located on another portion of the bike frame 119, on a mount coupled with a portion of the bike frame 119 or handlebar 200, or the like.

The rider interface 205 includes at least one control, such as the first rider interface 205A and may include a second rider interface 205B, it should be understood that in an embodiment, there may be only a single control, or in an embodiment there may be a set of controls. The rider interface 205 is mechanically and/or electronically connected (via wire/cable and/or wirelessly) to various components within the dropper seatpost 50. When the rider moves the rider interface 205, via the connections between the rider interface 205 and the dropper seatpost 50, she is causing a change in mechanical or hydraulic state within the dropper seatpost 50 allowing a change in saddle position relative to the bike frame 119.

Referring now to FIGS. 1 and 2, in one embodiment, dropper seatpost 50 includes a cable actuator interface. In one embodiment, a control cable couples the cable actuator interface with the control input 205. In general, the control cable can be internally routed, externally routed, or partially internally and externally routed.

For example, in one embodiment of an internally routed control cable configuration, the control cable is affixed to the rider interface 205 and will be run internally through bike frame 119 where it will be accessible at seat post opening 93. The control cable is then coupled with the cable actuator interface of dropper seatpost 50 and will remain within the frame 119 when the dropper seatpost 50 is inserted into seat post opening 93.

In contrast, in one embodiment of an externally routed control cable configuration, the control cable is affixed to the rider interface 205 and will run externally along a portion of bike frame 119 and the control cable with couple with cable actuator interface outside of the bike frame 119 when dropper seatpost 50 is installed on the bike 20.

In the case of a partially internally and externally routed control cable, in one embodiment, as the control cable traverses between dropper seatpost 50 and control input 205 portions of the control cable can be internal to the frame 119 and external to the frame 119.

Figure 3:
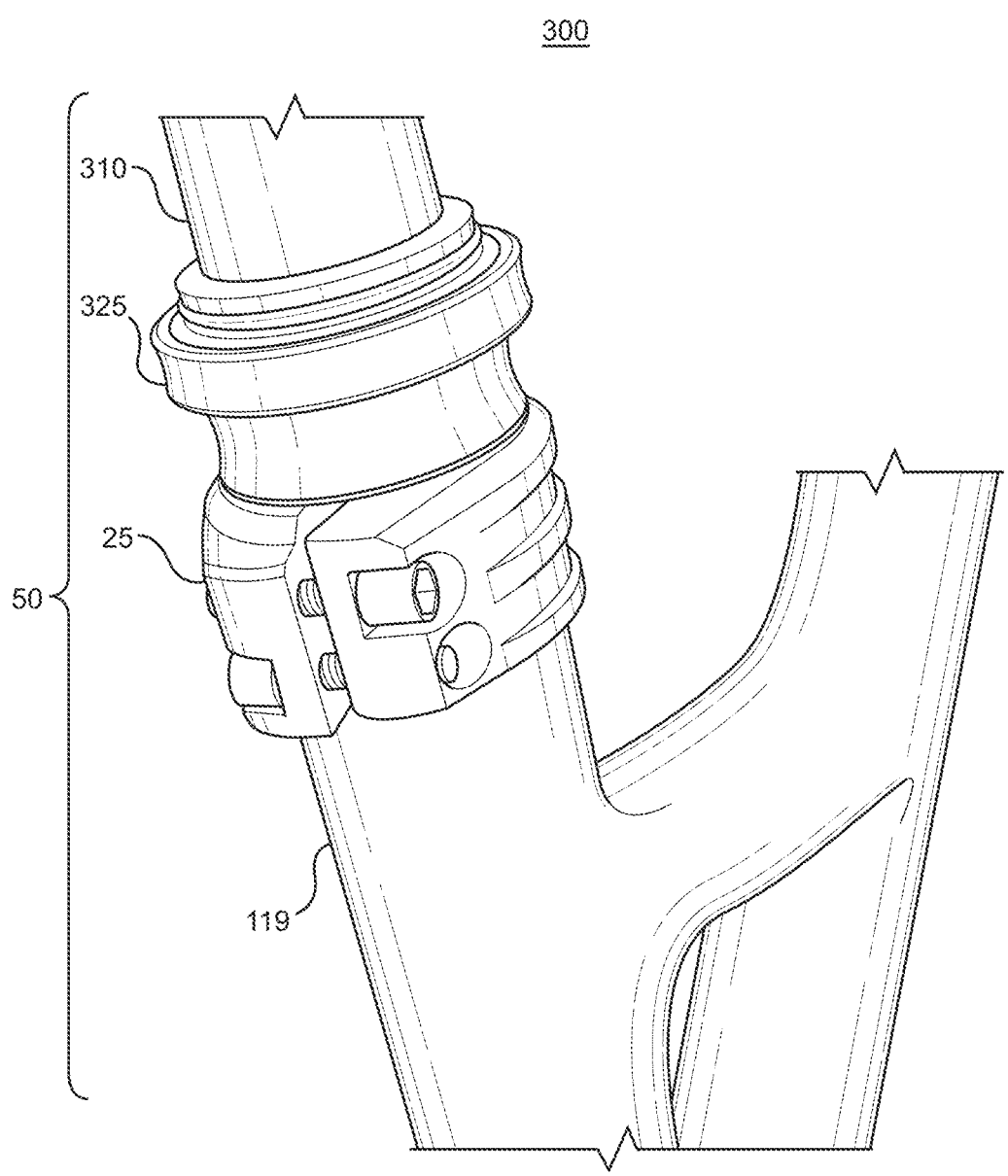
FIG. 3 is a partial perspective view of a dropper seatpost assembly installed in the seatpost retaining portion of the bike frame of FIG. 1, in accordance with an embodiment.

FIG. 3 is a partial perspective view of a portion of dropper seatpost 50 installed in the bike frame 119 of FIG. 1. In one embodiment, dropper seatpost 50 includes a seatpost collar 325 that is used to seat the dropper seatpost 50 within seat post opening 93 in bike frame 119.

Figure 4A:
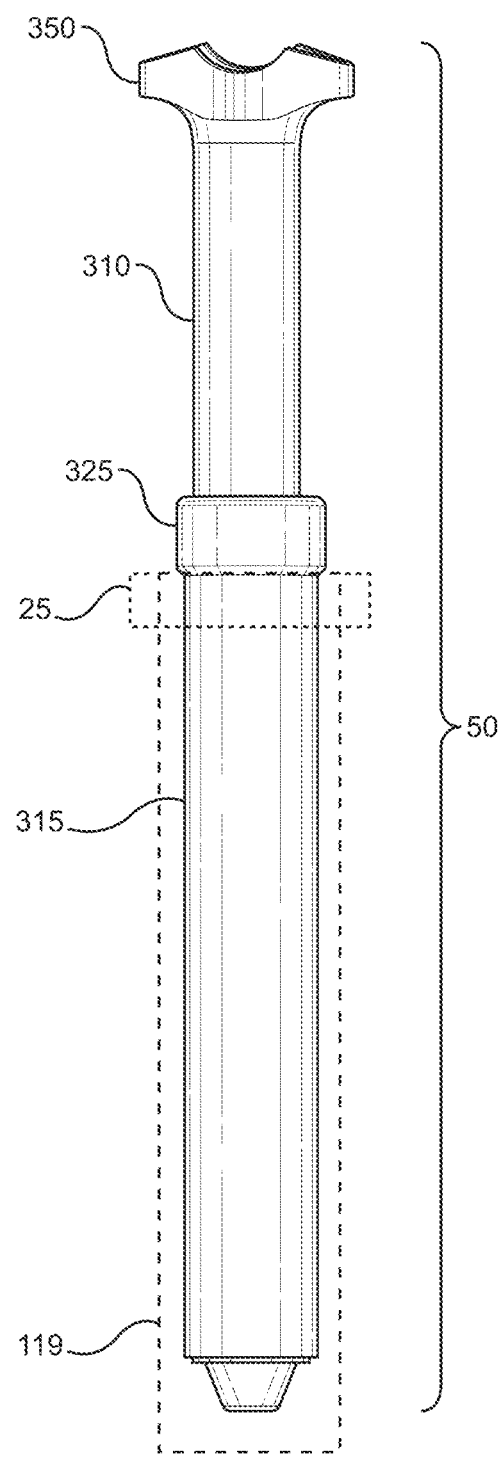
FIG. 4A is a perspective view of a dropper seatpost assembly, in accordance with an embodiment.

FIG. 4A is a perspective view of a dropper seatpost 50 shown in accordance with an embodiment. In one embodiment, the dropper seatpost 50 includes an upper post 310, a head assembly 350, a lower post 315, and a seatpost collar 325.

Referring now to FIGS. 3 and 4A, in one embodiment, seatpost retaining clamp 25 is used to provide a clamping pressure on the seat post opening 93 of bike frame 119 such that the lower post of dropper seatpost 50 is held fast in both insertion depth and head assembly 350 (and thus saddle 10) orientation.

In other words, the seatpost retaining clamp 25 is loosened to allow the rider to slip-fit (e.g., insert, remove, and orient) the lower post 315 of dropper seatpost 50 into seat post opening 93 of bike frame 119 and once the dropper seatpost 50 is oriented in the proper position, the seatpost retaining clamp 25 is tightened to maintain the orientation of dropper seatpost 50 with respect to bike frame 119.

In one embodiment, the orientation of the dropper seatpost 50 is based on the design of dropper seatpost 50 with respect to the forward and rear of bike frame 119. For example, instead of a linear seatpost design as shown in FIG. 4A, in one embodiment, a portion of the dropper seatpost (such as a top portion of upper post 310) will include a geometric feature to allow the saddle to be mounted to the head assembly 350 offset vertically from the seat post opening 93. For example, the offset may be a curve or other geometric feature that provides an offset saddle location of 1 or more centimeters rearward with respect to the location of seat post opening 93. Although an offset saddle location is described as being rearward, it should be appreciated that in one embodiment, the offset may be in a forward facing direction, e.g., toward the front (or handlebars 200) of bike 20.

In one embodiment, the orientation of the dropper seatpost 50 is based on the orientation of saddle 10 with respect to the bike frame 119. For example, the saddle 10 is oriented in a plane approximately parallel to the plane of bike frame 119. In other words, the front and rear of saddle 10 are similarly oriented with the front and rear of bike frame 119. In one embodiment, the saddle 10 orientation is adjusted by the rider.

Once the dropper seatpost 50 is inserted into seat post opening 93 of bike frame 119 and the saddle 10 is properly oriented, the seatpost retaining clamp 25 is then tightened down to "lock" the dropper seatpost 50 into the selected lower post height and saddle 10 orientation. In one embodiment, the "lock" consists of seatpost retaining clamp 25 applying a pressure about seat post opening 93 of bike frame 119 which reduces the size of seat post opening 93 of bike frame 119 causing a frictional coupling of lower post 315 with bike frame 119.

In one embodiment, the pressure applied by seatpost retaining clamp 25 (e.g., a pressure large enough to deform the size of seat post opening 93 of bike frame 119) will also deleteriously provide an amount of deformation on the portion of lower post 315 below seatpost collar 325.

In one embodiment, the upper post of dropper seatpost 50 extends upwards from the bike frame 119 to the head assembly 350 to which the saddle 10 is attached. The amount that the upper post of dropper seatpost 50 extends out of the frame 119 is adjustable. Dropper seatpost 50 may be made of various materials, such as, but not limited to: steel, aluminum, titanium, carbon fiber, and aluminum wrapped in carbon fiber.

In one embodiment, the location of seatpost collar 325 is fixed at or about the point of telescopic interaction between the upper post 310 and the lower post 315 of dropper seatpost 50. In one embodiment, the lower post 315 is inserted into seat post opening 93 of bike frame 119 until the seatpost collar 325 reaches seat post opening 93 of bike frame 119. Once fully inserted, the seatpost retaining clamp 25 is used to frictionally couple dropper seatpost 50 with bike frame 119.

Thus, in one embodiment, instead of adjusting the saddle height of saddle 10 above frame 119 by adjusting the amount of the seatpost inserted into seat post opening 93 of bike frame 119, in one embodiment, of a dropper seatpost 50, the lower post 315 is inserted into seat post opening 93 of bike frame 119 (to the point of seatpost collar 325), and the amount of upper post 310 that extends from dropper seatpost 50 is used to establish the desired saddle height.

In one embodiment, the upper post 310 telescopically slides with respect to lower post 315 upon actuation of rider interface 205 (of FIGS. 1-3). Thus, the upper post 310 can move up and down to adjust saddle height, while the lower post 315 of dropper seatpost 50 is retained with respect to the frame 119 by seatpost clamp 25. Thus, once oriented by the rider, seatpost clamp 25 does not allow lower post 315 to move (rotationally or vertically) with respect to the bike frame 119.

In another embodiment, the dropper seatpost 50 is inverted. That is, the upper post 310 telescopically slides about the exterior of lower post 315 upon actuation of rider interface 205 (of FIGS. 1-3). Thus, the upper post 310 can move up and down to adjust saddle height, while the lower post 315 of dropper seatpost 50 is retained with respect to the frame 119 by seatpost clamp 25. Thus, once oriented by the rider, seatpost clamp 25 does not allow lower post 315 to move (rotationally or vertically) with respect to the bike frame 119.

Additional details regarding the operation of a dropper seatpost are found in U.S. Pat. No. 9,422,018 entitled "Seatpost" which is assigned to the assignee of the present application, and which is incorporated herein by reference in its entirety.

Figure 4B:
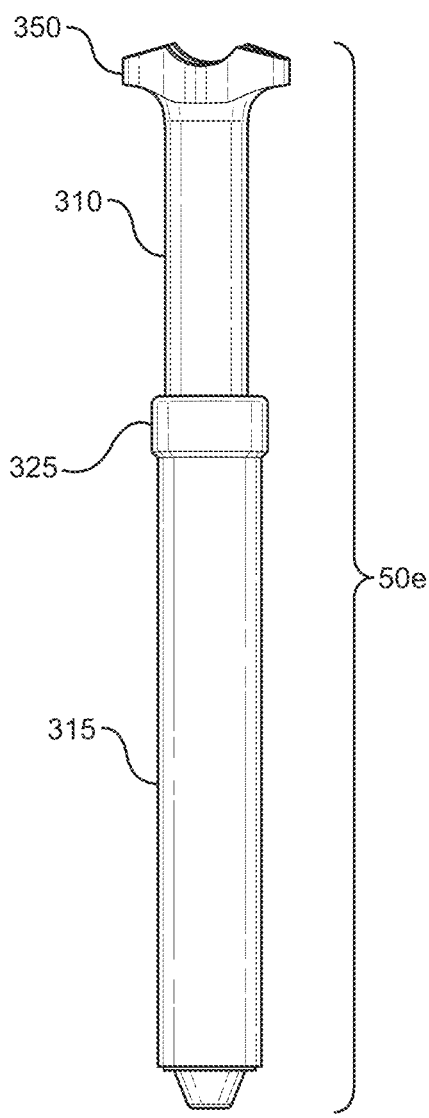
FIG. 4B is a perspective view of the dropper seatpost of FIG. 4A in an extended position, in accordance with an embodiment.

With reference now to FIG. 4B, a perspective view of dropper seatpost 50e in an extended position is shown in accordance with one embodiment. In one embodiment, dropper seatpost 50e illustrates a full extension of dropper seatpost 50 (e.g., the highest saddle height when the largest amount of upper post 310 is extended from lower post 315).

In one embodiment, dropper seatpost 50e illustrates a partial extension of dropper seatpost 50. For example, a first rider might have the extended position of the dropper seatpost 50e (e.g., the exposed length of upper post 310) set at a length of 80 millimeters (mm) but not at a maximum extended length (e.g., 120 mm, 150 mm, 200 mm, etc.). In contrast, a second rider might have the extended position of the dropper seatpost 50e set at a length of 100 mm but not at the maximum extended length (e.g., 120 mm, 150 mm, 200 mm, etc.).

Although a number of extended lengths for dropper seatpost 50e are described, it should be appreciated that other embodiments may include dropper seatposts with different maximum extended lengths. Similarly, in one embodiment, the dropper seatpost 50e may have a pre-defined number of different selectable extension lengths, e.g., 25 mm, 50 mm, 80 mm, etc. In one embodiment, the dropper seatpost 50e may have an "infinite" number of different selectable extension lengths (e.g., anywhere from almost fully compressed all the way to fully extended) that can be selected and/or set by the rider.

Figure 4C:
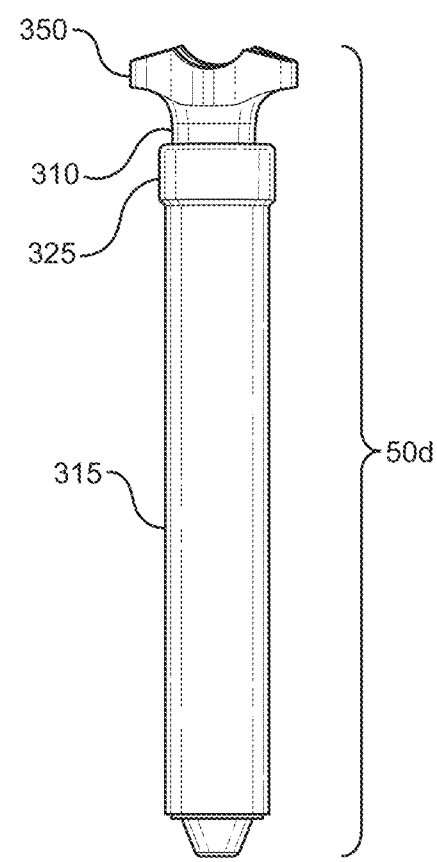
FIG. 4C is a perspective view of the dropper seatpost of FIG. 4A in a contracted position, in accordance with an embodiment.

With reference now to FIG. 4C, a perspective view of dropper seatpost 50d in a compression position is shown in accordance with one embodiment. In one embodiment, dropper seatpost 50d illustrates a dropper seatpost at full compression (e.g., the lowest saddle height when the smallest amount of upper post 310 is extended from lower post 315).

In one embodiment, dropper seatpost 50d illustrates a partial compressed dropper seatpost 50. For example, a first rider might have the compressed position of the dropper seatpost 50d (e.g., the exposed length of upper post 310) set at a length of 20 mm instead of the maximum compressed length (e.g., 0 mm, 6 mm, 12 mm, etc.). In contrast, a second rider might have the compressed position of the dropper seatpost 50d (e.g., the exposed length of upper post 310) set at a length of 50 mm instead of the maximum compressed length (e.g., 0 mm, 4 mm, 10 mm, etc.).

Although a number of compressed lengths for dropper seatpost 50e are described, it should be appreciated that other embodiments may include dropper seatposts with different compressed lengths. Similarly, in one embodiment, the dropper seatpost 50e may have a pre-defined number of different selectable compression lengths, e.g., 0 mm, 5 mm, 8 mm, 20 mm, etc. In one embodiment, the dropper seatpost 50d may have an "infinite" number of different selectable extension lengths (e.g., anywhere from fully compressed to almost fully extended) that can be selected and/or set by the rider. Thus, it should be appreciated that in one embodiment, the dropper seatpost 50 is able to be set to any saddle height extension length and any saddle height compression length.

Referring again to FIG. 4A and to FIG. 4B, in one embodiment, the normal saddle height is set by the rider. For example, a dropper seatpost 50 has a maximum saddle height of 100 mm. During the setup, the rider would set the normal saddle height (e.g., any height up to the maximum 100 mm extended height) based on the rider's preferences. For purposes of the example, the rider will set the normal saddle height to 80 mm.

Referring now to FIGS. 4A-4C, in one embodiment, the rider will also establish the rider specific drop distance. Using the above example, the dropper seatpost 50 has a maximum saddle height of 100 mm, and the rider has set the normal saddle height to 80 mm. The rider would then set the compression or drop saddle height (e.g., the saddle height when the seatpost is dropped away) based on the normal drop saddle height setting for the given rider. For purposes of the example, the rider will set the drop saddle height at 5 mm.

In one embodiment, when a change in saddle height of saddle 10 is desired, (e.g., due to hills, terrain, aerodynamics, speed, riding style, etc.), a rider will cause the dropper seatpost 50 to lower from the normal saddle height to the drop saddle height by triggering rider interface 205 (or another trigger) while the rider also depresses the saddle 10. Typically, the actuating lever of a dropper seatpost will open a valve or latch in the dropper seatpost 50 so that the dropper seatpost 50 can move up or down.

In one embodiment, dropper seatpost 50 has an air spring and while the rider's weight is used to move it down, the air spring will raise the saddle 10 back to the normal saddle height when the valve or latch internal to the dropper seatpost 50 is opened (such as via rider interface 205). In one embodiment, dropper seatpost 50 is "micro-adjustable".

There are two types of micro-adjustable seatposts: (1) seatposts that can be continuously adjusted to an infinite number of positions; and (2) seatposts that can only be adjusted to a predetermined (preprogrammed) number of positions.

For example, with regard to dropper seatposts that can only be adjusted to a preprogrammed number of positions, the dropper seatpost adjustment positions may be that of the following three positions: normal, middle, and drop. Generally, the rider prefers that the dropper seatpost 50 be in the normal position during a ride over flat terrain, a road surface, or pedaling up small hills on a road surface. In one embodiment, the rider will adjust the dropper seatpost 50 to the "middle" position when the rider still wants to change a riding position to apply more power to the pedals but only needs the saddle to be partially lowered out of the way. This situation may occur while riding down a gentle hill or when the rider anticipates having to climb a hill immediately after a short decent. In one embodiment, the rider will adjust the dropper seatpost 50 to the drop position when the rider is sprinting, ascending a hill in a standing position, traversing bumpy, rocky, or rough terrain, and/or descending a steep hillside. For example, when descending a steep hill, the rider might want the saddle height in the dropped position so they could position themselves rearward of the saddle. By so doing, the rider changes her center of gravity (CG) (and thus the CG of the bike) rearward. By moving the CG rearward, a more stable and safer downhill riding geometry is achieved.

Lower Post Distortion

Figure 5:
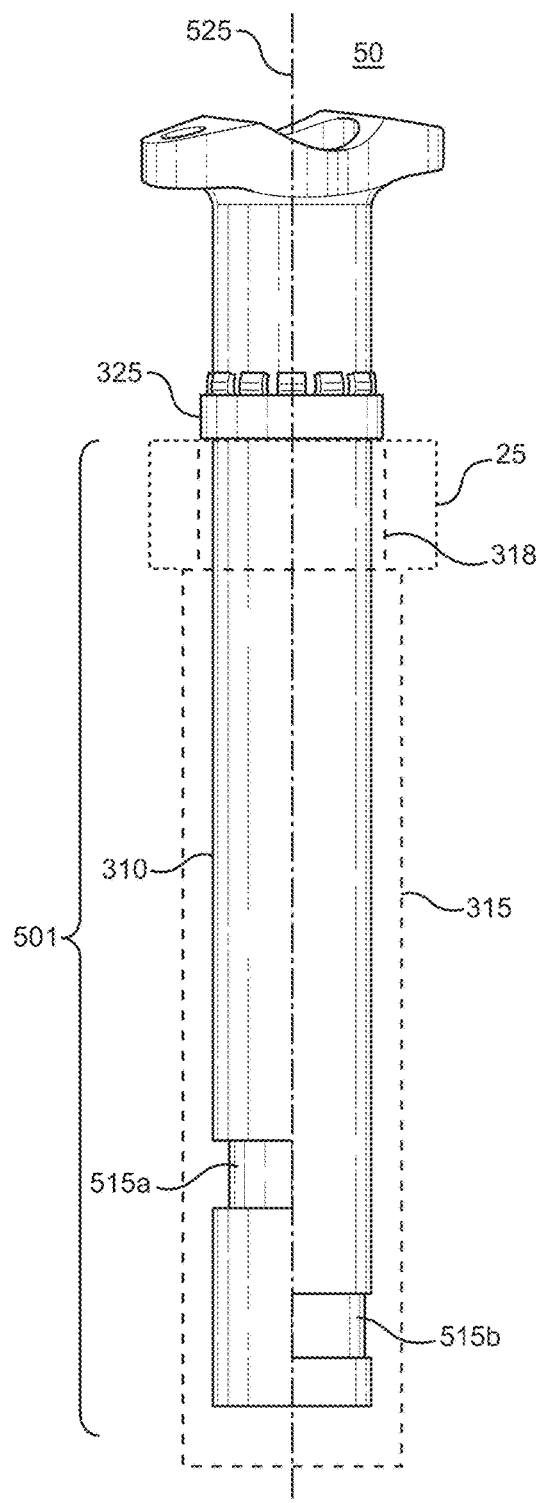
FIG. 5 is a perspective view of an upper post of the dropper seatpost assembly having offset bushings, in accordance with an embodiment.

Referring now to FIG. 5, a perspective view of the inner telescopic portion of the dropper seatpost 50 is shown in accordance with an embodiment. FIG. 5 includes upper post 310, lower post 315 (shown by a dotted silhouette), seatpost collar 325 and a translating mechanism (in this example, two offset bushings e.g., semicircular bushing 515a and semicircular bushing 515b). In one embodiment, semicircular bushing 515a and semicircular bushing 515b are formed in upper post 310 and used to prevent lateral motion between the lower post 315 and upper post 310. In one embodiment, semicircular bushing 515a and semicircular bushing 515b are also used to maintain the orientation of upper post 310 with respect to lower post 315, such that the front-to-back orientation of saddle 10 remains unchanged with respect to the plane of bike frame 119.

For example, as the upper post 310 is retracted, the semicircular bushing 515a and semicircular bushing 515b ensure that upper post 310 prevent lateral motion with respect to lower post 315 while allowing telescopic motion. Similarly, as the upper post 310 extends (or returns) to the normal saddle height, the semicircular bushing 515a and semicircular bushing 515b will prevent lateral motion between upper post 310 and lower post 315. In one embodiment, instead of being formed on upper post 310, semicircular bushing 515a and semicircular bushing 515b are formed on lower post 315.

In one embodiment, if the seatpost retaining clamp 25 is fastened too tightly, the telescopic capability of the upper post 310 with respect to the lower post 315 can be deleteriously affected. For example, if seatpost retaining clamp 25 is fastened too tightly, it can cause a deformation such as deformation 318 in the shape of lower post 315.

For example, when the seatpost retaining clamp 25 is tightened, seatpost retaining clamp 25 will deform seat post opening 93 causing dropper seatpost 50 to be frictionally coupled in a fixed position/orientation. In one embodiment, the tightening (or torquing down) of seatpost retaining clamp 25 will not only deform seat post opening 93 but will also cause a deformation 318 in lower post 315. In one embodiment, if deformation 318 is large enough, it can restrict the motion of upper post 310 especially when the translation mechanism has to pass through the deformation 318 section.

Often, the restriction of the motion of upper post 310 is not recognized during the change from normal saddle height to a drop saddle height, since the rider's weight is used to lower the upper post 310 with respect to the lower post 315. However, to return the saddle 10 to the normal saddle height, the dropper seatpost 50 uses an air spring, air pressure, mechanical coil spring, or the like to raise upper post 310. In one embodiment, due to size and weight considerations, the force used to return the saddle 10 to the normal saddle height is much less than the pressure generated by the rider's weight used during the lowering or compression of the dropper seatpost 50. As such, the deformation 318 in the lower post 315 caused by seatpost retaining clamp 25 restriction is usually not large enough to stop the lowering of upper post 310, but may be large enough to restrict the corresponding return to normal saddle height of upper post 310.

One embodiment provides a solution to the deformation of lower post 315 caused by the overtightening of seatpost retaining clamp 25, by offsetting one or more parts of a translating mechanism such that the translating mechanism portion of upper post 310 is not 'pinched' or otherwise impeded in its range of motion, even when a deformation 318 is introduced into lower post 315 (such as by an overtightening of seatpost retaining clamp 25, an impact to lower post 315, or the like).

In one embodiment, the translation mechanism (e.g., semicircular bushing 515a and semicircular bushing 515b) are offset axially along axis 525 of dropper seatpost 50. In one embodiment, by axially offsetting semicircular bushing 515a and semicircular bushing 515b, if there is a deformation 318 in lower post 315 caused by the clamping pressure exerted by seatpost retaining clamp 25, there will be enough distance along the axis 525 to allow the semicircular bushing 515a to pass deformation 318 before the semicircular bushing 515b has to pass deformation 318. As such, the "wiggle" room will allow upper post 310 to get past the deformation 318 during its return to the normal saddle height thereby ensuring that upper post 310 does not get "bound up" by the deformation 318 in lower post 315. In one embodiment, even though the offset of semicircular bushing 515a and semicircular bushing 515b provides an amount of "wiggle" room to bypass a deformation 318, semicircular bushing 515a and semicircular bushing 515b will otherwise prevent relative lateral motion between the upper and lower post.

In one embodiment, semicircular bushing 515a and semicircular bushing 515b are offset along axis 525 and moved to a front bushing location and rear bushing location (with respect to the front and rear of bike 20).

Figure 6:
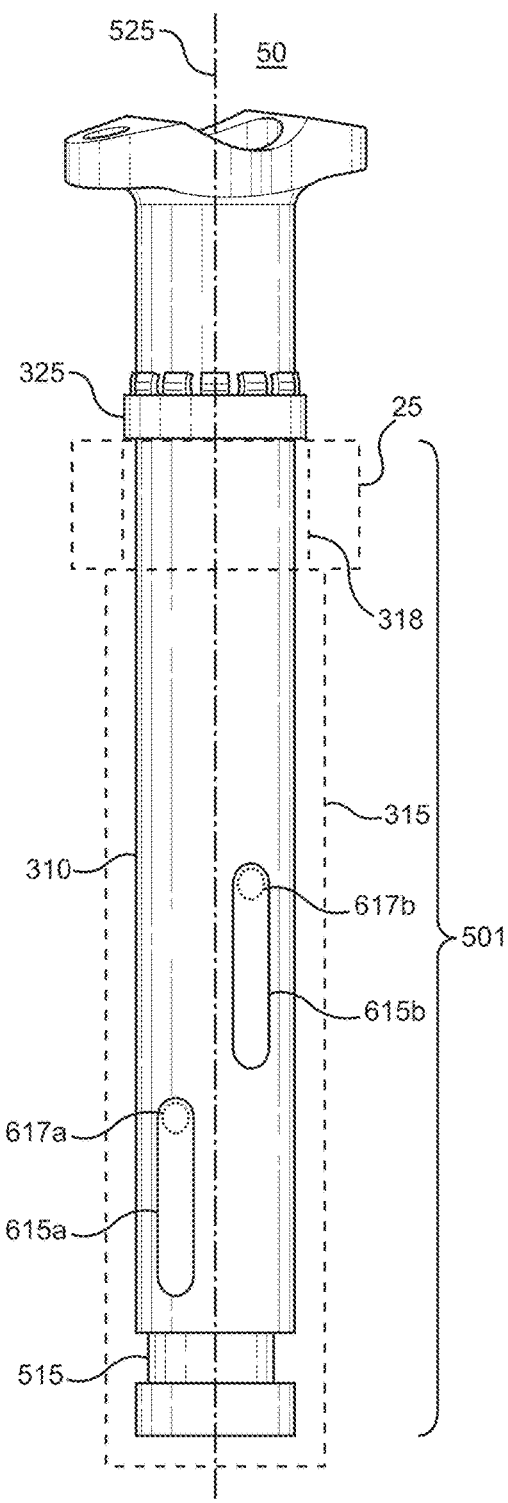
FIG. 6 is a perspective view of an upper post of the dropper seatpost assembly having offset alignment features, in accordance with an embodiment.

With reference now to FIG. 6, a perspective view of the inner telescopic portion of the dropper seatpost 50 is shown in accordance with an embodiment. FIG. 6 includes upper post 310, lower post 315 (shown by a dotted silhouette), seatpost collar 325, and a translating mechanism (in this example two sets of offset slots 615a and 615b and pins 617a and 617b). In one embodiment, dropper seatpost 50 of FIG. 6 includes an optional bushing 515. In one embodiment, dropper seatpost 50 of FIG. 6 does not include optional bushing 515.

In one embodiment, slots 615a and 615b are formed in upper post 310 and pins 617a and 617b are coupled with lower post 315. In general, slot 615a and pin 617a and slot 615*b* and pin 617*b* are used to maintain the orientation and/or overall movement range of upper post 310 with respect to lower post 315, such that the front-to-back orientation of saddle 10 remains unchanged with respect to the plane of bike frame 119.

In one embodiment, slots 615*a* and 615*b* are formed in lower post 315 and pins 617*a* and 617*b* are coupled with upper post 310. Although two sets of slots and pins are shown, in should be appreciated that in one embodiment, there may be more than two sets of slots and pins.

In one embodiment, as the upper post 310 is retracted, the slots 615*a* and 615*b* and pins 617*a* and 617*b* ensure that upper post 310 does not rotate with respect to lower post 315 thereby changing the orientation of saddle 10. Similarly, as the upper post 310 extends (or returns) to the normal saddle height, the slots 615*a* and 615*b* and pins 617*a* and 617*b* will ensure that upper post 310 does not rotate with respect to lower post 315 thereby changing the front-to-back orientation of saddle 10.

In one embodiment, the translating mechanism (e.g., the slots 615*a* and 615*b* and pins 617*a* and 617*b*) are offset axially along axis 525. In one embodiment, the slot 615*a* and pin 617*a* and slot 615*b* and pin 617*b* are offset in a helical pattern along axis 525 such that angular free play is not affected.

In one embodiment, by axially offsetting slot 615*a* and pin 617*a* and slot 615*b* and pin 617*b*, if there is a deformation 318 in lower post 315 (such as described herein), there will be enough distance along the axis 525 to allow the first translating mechanism (e.g., slot 615*a* and pin 617*a*) to pass deformation 318 before the second translating mechanism (e.g., slot 615*b* and pin 617*b*) has to pass deformation 318. As such, the "wiggle" room provided by the offset will allow upper post 310 to pass through deformation 318 during its return to the normal saddle height thereby ensuring that upper post 310 does not get "bound up".

Figure 7:
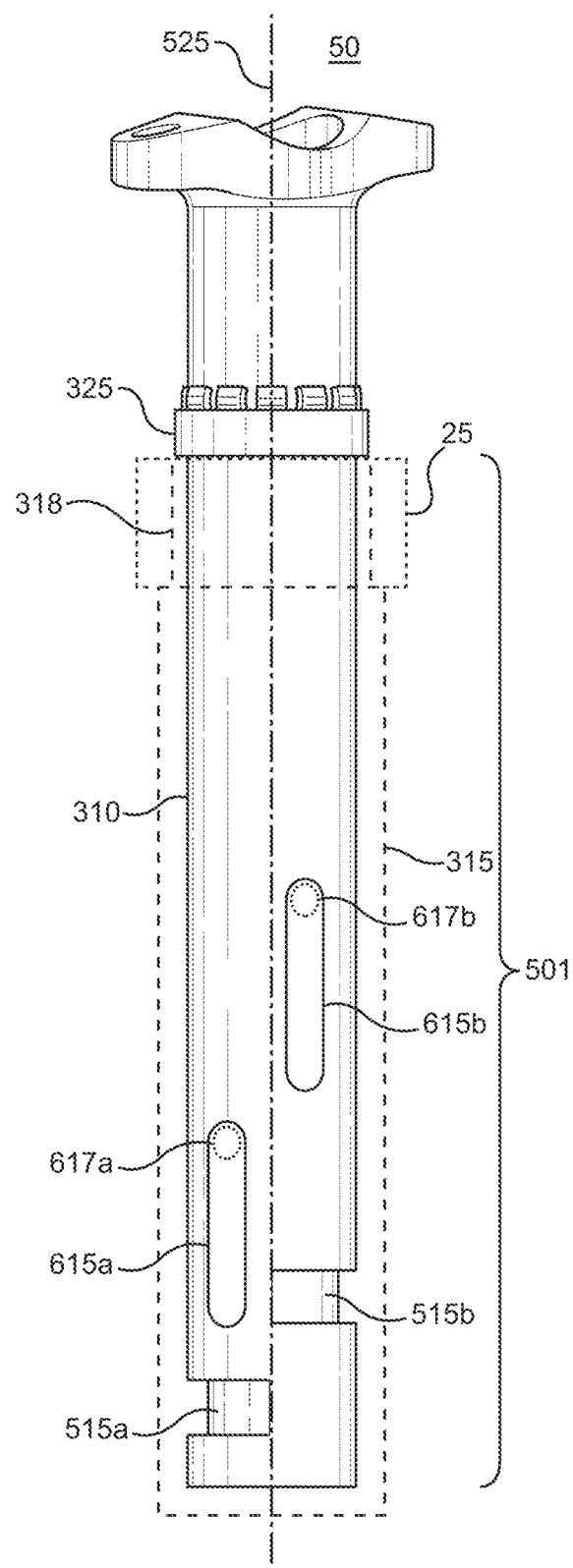
FIG. 7 is a perspective view of an upper post of the dropper seatpost assembly having offset bushings and offset alignment features, in accordance with an embodiment.

Referring now to FIG. 7, a perspective view of an upper post of the dropper seatpost assembly 50 having offset bushings and offset alignment features is shown in accordance with an embodiment. In other words, the translating mechanism can include both the offset bushings 515*a* and 515*b*, as well as the offset slot 615*a* and pin 617*a* and slot 615*b* and pin 617*b*. By providing an offset to the bushings 515*a* and 515*b*, and slot 615*a* and pin 617*a* and slot 615*b* and pin 617*b*, each of the different translating mechanism components will have "wiggle" room that will allow upper post 310 to get past the deformation 318 during compression and return such that upper post 310 will not get "bound up" by the deformation 318.

Although the term "wiggle" room is used, it is not meant to suggest that the upper post 310 will wiggle with respect to lower post 315. Instead, the point of the translating mechanism is to ensure the two posts don't normally wiggle or have any type of lateral movement therebetween. Thus, the term "wiggle" room is used to identify a characteristic that is achieved by the offsetting of two or more aspects of the translating mechanism such that when a deformation 318 is encountered, the translating mechanism does not encounter it at the same location along upper post 310 (thereby binding) but instead is able to pass a first portion of the translating mechanism through the deformation 318 before at least the second portion of the translating mechanism encounters the deformation 318. As such, any actual wiggle implied by the "wiggle" room will only occur when the different portions of the offset translating mechanism pass through a deformation 318.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

We claim:

1. A dropper seatpost assembly comprising:
    a lower post;
    an upper post configured to telescopically move with respect to said lower post; and a translating mechanism configured to maintain an orientation of said upper post with respect to said lower post when said upper post telescopically moves with respect to said lower post, said translating mechanism comprising two or more vertically offset features, said orientation selected from the group consisting of a lateral orientation and a rotational orientation, wherein said two or more vertically offset features of said translating mechanism comprise:
        a first semicircular bushing located at a first location axially along said upper post; and
        at least a second semicircular bushing located at a second location axially along said upper post, said second location vertically offset from said first location.

2. The dropper seatpost assembly of claim 1, further comprising:
    said lower post having a lower post inner diameter (ID) and a lower post outer diameter (OD); and
    said upper post having an upper post OD, said upper post OD smaller than said lower post ID, such that said upper post is configured to telescopically move within said lower post.

3. The dropper seatpost assembly of claim 1, wherein said two or more vertically offset features of said translating mechanism are coupled with one of said upper post and said lower post.

4. The dropper seat assembly of claim 1, further comprising:
    said first semicircular bushing oriented toward a front of a bicycle frame when said dropper seatpost assembly is installed in a seatpost retaining portion of said bicycle frame; and
    said at least said second semicircular bushing oriented toward a back of said bicycle frame when said dropper seatpost assembly is installed in said seatpost retaining portion.

5. The dropper seat assembly of claim 1, wherein said two or more vertically offset features of said translating mechanism comprise:
    a first slot located at a first location axially along said upper post;
    a first pin located on said lower post, said first pin oriented to interact with said first slot;

at least a second slot located at a second location axially along said upper post, said second location vertically offset from said first location; and at least a second pin located on said lower post, said second pin oriented to interact with said at least said second slot.

6. The dropper seat assembly of claim 1, wherein said two or more vertically offset features of said translating mechanism comprise:

a first semicircular bushing located at a first location axially along said upper post;

at least a second semicircular bushing located at a second location axially along said upper post, said second location vertically offset from said first location;

a first slot located at a third location axially along said upper post, said third location vertically offset from said first location and said second location; and a first pin located on said lower post, said first pin oriented to interact with said first slot.

7. The dropper seat assembly of claim 1, wherein said two or more vertically offset features of said translating mechanism comprise:

a first semicircular bushing located at a first location axially along said upper post;

at least a second semicircular bushing located at a second location axially along said upper post, said second location vertically offset from said first location;

a first pin located at a third location axially along said upper post, said third location vertically offset from said first location and said second location; and a first slot located on said lower post, said first slot oriented to interact with said first pin.

8. A dropper seatpost assembly comprising:

a lower post configured to couple with a seatpost retaining portion of a bicycle frame;

an upper post configured to telescopically move with respect to said lower post;

a head assembly coupled with said upper post, said head assembly to retain a saddle; and a translating mechanism configured maintain an orientation of said upper post with respect to said lower post when said upper post telescopically moves with respect to said lower post, said translating mechanism comprising two or more features offset axially along said dropper seatpost assembly, said orientation selected from the group consisting of a lateral orientation and a rotational orientation, wherein said two or more features of said translating mechanism are coupled with one of said upper post and said lower post.

9. The dropper seatpost assembly of claim 8, further comprising:

said lower post having a lower post inner diameter (ID) and a lower post outer diameter (OD); and said upper post having an upper post OD, said upper post OD smaller than said lower post ID, such that said upper post is configured to telescopically move within said lower post.

10. The dropper seatpost assembly of claim 8, further comprising:

said lower post having a lower post inner diameter (ID) and a lower post outer diameter (OD); and said upper post having an upper post ID and an upper post OD, said upper post OD smaller than said lower post ID, such that said upper post is configured to telescopically move within said lower post.

11. The dropper seat assembly of claim 9, wherein said two or more features of said translating mechanism comprise:

a first semicircular bushing located at a first location axially along said dropper seatpost assembly; and at least a second semicircular bushing located at a second location axially along said dropper seatpost assembly, said second location axially along said dropper seatpost assembly offset from said first location.

12. The dropper seat assembly of claim 9, wherein said two or more features of said translating mechanism comprise:

a first semicircular bushing located at a first location axially along said dropper seatpost assembly, said first location oriented toward a front of said bicycle frame when said dropper seatpost assembly is installed in said seatpost retaining portion; and at least a second semicircular bushing located at a second location axially along said dropper seatpost assembly, said second location oriented toward a back of said bicycle frame when said dropper seatpost assembly is installed in said seatpost retaining portion.

13. The dropper seatpost assembly of claim 8, further comprising:

at least one of said two or more features of said translating mechanism is coupled with said upper post; and at least another of said two or more features of said translating mechanism is coupled with said lower post.

14. The dropper seat assembly of claim 13, wherein said two or more features of said translating mechanism comprise:

a first slot located at a first location axially along said upper post;

a first pin located on said lower post, said first pin oriented to interact with said first slot;

at least a second slot located at a second location axially along said upper post, said second location axially along said upper post and offset from said first location; and at least a second pin located on said lower post, said second pin oriented to interact with said second slot.

15. The dropper seat assembly of claim 13, wherein said two or more features of said translating mechanism comprise:

a first slot located at a first location axially along said lower post;

a first pin located on said upper post, said first pin oriented to interact with said first slot;

at least a second slot located at a second location axially along said lower post, said second location axially along said lower post and offset from said first location; and at least a second pin located on said upper post, said second pin oriented to interact with said second slot.

16. The dropper seat assembly of claim 8, wherein said two or more features of said translating mechanism comprise:

a first semicircular bushing located at a first location axially along said upper post;

at least a second semicircular bushing located at a second location axially along said upper post, said second location axially offset from said first location;

a first slot located at a third location axially along said upper post, said third location axially offset from said first location and said second location; and a first pin located on said lower post, said first pin oriented to interact with said first slot.

17. A dropper seatpost assembly comprising:
a lower post configured to couple with a seatpost retaining portion of a bicycle frame;
an upper post configured to telescopically move with respect to said lower post;
a head assembly coupled with said upper post, said head assembly to retain a saddle; and a translating mechanism configured to maintain an orientation of said upper post with respect to said lower post when said upper post telescopically moves telescopically moves with respect to said lower post, said translating mechanism comprising of two or more axially offset features, said orientation selected from the group consisting of a lateral orientation and a rotational orientation, wherein said two or more axially offset features of said translating mechanism comprise:
- a first semicircular bushing located at a first location axially along said upper post, said first location oriented toward a front of said bicycle frame when said dropper seatpost assembly is installed in said seatpost retaining portion; and
- at least a second semicircular bushing located at a second location axially along said upper post, said second location oriented toward a back of said bicycle frame when said dropper seatpost assembly is installed in said seatpost retaining portion.

18. The dropper seat assembly of claim 17, wherein said two or more axially offset features of said translating mechanism comprise:
- a first slot located at a first location axially along said upper post;
- a first pin located on said lower post, said first pin oriented to interact with said first slot;
- at least a second slot located at a second location axially along said upper post, said second location axially along said upper post and offset from said first location; and
- at least a second pin located on said lower post, said second pin oriented to interact with said second slot.

19. The dropper seat assembly of claim 17, wherein said two or more axially offset features of said translating mechanism comprise:
- a first slot located at a first location axially along said lower post;
- a first pin located on said upper post, said first pin oriented to interact with said first slot;
- at least a second slot located at a second location axially along said lower post, said second location axially along said lower post and offset from said first location; and
- at least a second pin located on said upper post, said second pin oriented to interact with said second slot.

20. The dropper seat assembly of claim 17, wherein said two or more axially offset features of said translating mechanism comprise:
- a first semicircular bushing located at a first location axially along said upper post;
- at least a second semicircular bushing located at a second location axially along said upper post, said second location axially offset from said first location;
- a first slot located at a third location axially along said upper post, said third location axially offset from said first location and said second location; and
- a first pin located on said lower post, said first pin oriented to interact with said first slot.

21. The dropper seat assembly of claim 17, wherein said two or more axially offset features of said translating mechanism comprise:
- a first semicircular bushing located at a first location axially along said upper post;
- at least a second semicircular bushing located at a second location axially along said upper post, said second location axially offset from said first location;
- a first pin located at a third location axially along said upper post, said third location axially offset from said first location and said second location; and
a first slot located on said lower post, said first slot oriented to interact with said first pin.

* * * * *